3,304,064
SHAKER MIXING CONVEYOR

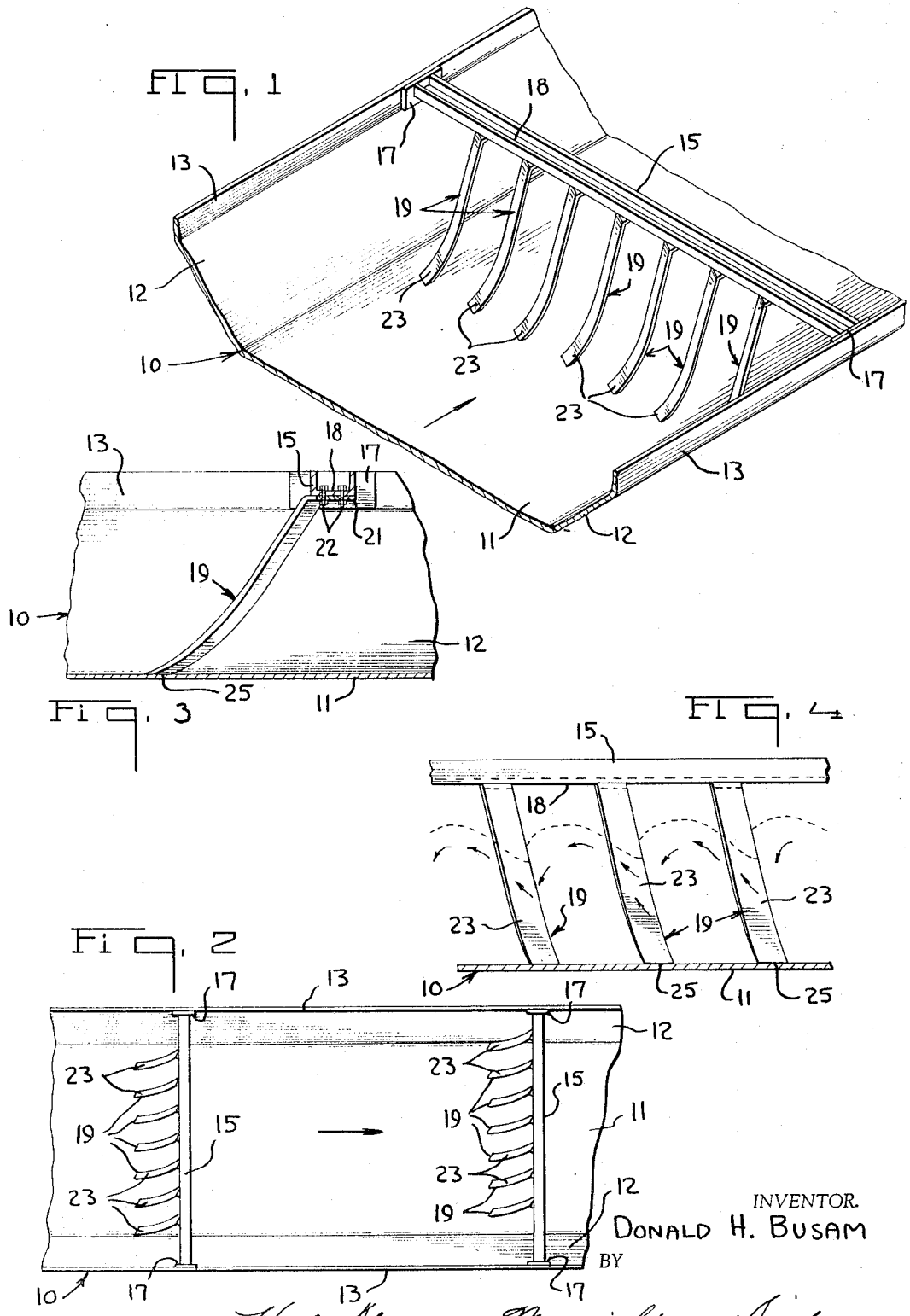

Donald H. Busam, Hometown, Ill., assignor to Westinghouse Air Brake Company, Pittsburgh, Pa., a corporation of Pennsylvania
Filed Oct. 11, 1965, Ser. No. 494,362
9 Claims. (Cl. 259—94)

This invention relates to improvements in shaker conveyors and more particularly relates to an improved form of shaker trough adapted to convey and mix molding sand and the like.

Conveyors of the reciprocating or shaker type, reciprocably driven with relatively long strokes, to effect the flow of material therealong in one direction, have heretofore had a wide use in industrial installations and particularly in foundries to convey molding sand, as well as castings, scrap, sprues and gates, and scale.

Such conveyors usually consist of a series of troughs connected in end to end relation with respect to each other and supported for reciprocable movement with respect to the ground and driven from a reciprocable driven mechanism, rigidly mounted on a permanent foundation.

In the conveying of molding sand in a foundry, the sand is frequently too dry to efficiently bind during the molding process, and is moistened by adding water thereto by sprinkling over the top of the sand as it is flowed along the trough line by the reciprocable movement of the trough line. While the natural oscillatable movement of the trough line will effect some mixing of the sand with water, the moisture content of the sand is seldom uniform and the bottom layer of the sand is apt to be too dry for molding, unless manually mixed as discharged from the trough line.

A principal object of the present invention, therefore, is to remedy the foregoing deficiencies in shaker conveyor trough lines used for conveying molding sand, by so constructing the troughs of the trough line as to effect a thorough mixing of the sand by the natural reciprocable movement of the trough line.

Another object of the invention is to provide an improved form of shaker conveyor trough particularly adapted for molding sand, having a simplified form of plow-like vanes extending into the trough for turning up the sand from the bottom of the trough to effect a uniform mixture of the said, conveyed along the trough.

A still further object of the invention is to provide a shaker conveyor mixing trough so arranged as to thoroughly mix the sand as it travels therealong by the reciprocable motion of the trough, by providing a series of spaced plow-like vanes extending downwardly into the trough toward the bottom thereof pitched to heave the sand upwardly from the bottom of the trough as it is conveyed therealong to effect a thorough turning over and side motion of the sand in the trough as it is conveyed therealong.

Still another object of the invention is to provide a simple and improved form of shaker conveyor mixing trough having a flat bottom and flared side walls extending upwardly therefrom, for substantially the length thereof, in which sets of laterally spaced spiral plow-like vanes are supported along the trough from positions adjacent the tops of the side walls thereof and extend downwardly into the trough in helical paths inclined toward the bottom of the trough in a direction facing the sand as it travels along the trough to flow the sand at the bottom of the trough upwardly and laterally over the sand at the top of the trough, and to thereby effect a thorough mixing of the sand as it travels along the trough.

These and other objects of the invention will appear from time to time as the following specification proceeds and with reference to the accompanying drawing wherein:

FIGURE 1 is a fragmentary generally perspective view of a portion of the shaker conveyor trough and illustrating one form in which the invention may be embodied;

FIGURE 2 is a top plan view of a section of the conveyor trough shown in FIGURE 1;

FIGURE 3 is a fragmentary longitudinal sectional view taken through the trough shown in FIGURES 1 and 2 in order to illustrate the mixing plows in side elevation; and FIGURE 4 is a fragmentary transverse sectional view taken through the conveyor trough, showing the mixing plow-like vanes in end elevation, looking at the mixing plow-like vanes in the direction of travel of material along the trough, and diagrammatically illustrating the mixing of the sand as conveyed along the trough.

In the embodiment of the invention illustrated in the drawings, I have shown in FIGURES 1 and 2 a section of a shaker conveyor pan or trough, adapted to be connected in a shaker conveyor trough line in end to end relation with adjacent troughs in the trough line, to effect the movement of the material therealong upon reciprocable movement of the trough line. The trough 10 may be supported on suitable supports, such as roller supports (not shown) for reciprocable movement with respect to the ground and may be driven by a conventional shaker conveyor drive mechanism (not shown) reciprocably driving the trough with relatively long strokes, to effect movement of material along the trough line in the direction of the arrow shown in FIGURES 1 and 2.

The trough 10 is shown as having a relatively flat bottom 11 having inclined side walls 12, 12 flaring outwardly and upwardly from opposite sides of said bottom and terminating into parallel upright flanges 13 extending for the length of said trough. The trough 10 may be connected at its ends with other similar troughs, and may be connected with the shaker conveyor drive mechanism (not shown) in a conventional manner, and no part of the present invention so not herein shown as described further.

Referring now in particular to the mixing features of the trough 10, a support 15 extends across the trough between the flanges 13, 13 and is herein shown as being in the form of an upwardly facing channel having mounting plates 17, 17 welded or otherwise secured to opposite ends thereof. The mounting plates 17, 17 are adapted to abut the insides of the flanges 13, 13 and may be bolted or otherwise secured thereto.

The support 15 has a web 18 forming a mounting means for a plurality of mixing plow-like vanes 19 suspended therefrom and extending angularly downwardly therefrom toward the receiving end of the trough. As shown in FIGURE 3 each plow-like vane 19 has a generally horizontal tab or ear 21 abutting the undersurface of the web 18 and secured thereto as by nuts and bolts 22. The plow-like vane 19 extends angularly downwardly from the tab 21 and has a helical face 23 facing in the direction of flow of material along the trough 10.

In FIGURES 1, 2 and 3 each plow-like vane 19 is shown as transversely inclined with respect to the support 15 and is also curved downwardly about a relatively large radius to position the face 23 thereof in the general form of a helix. The vane 19 terminates at its lower end into a bottom face 25, engaging the top surface of the bottom 11 of the trough 10 and extending diagonally with respect to the bottom of said trough and welded or otherwise secured thereto. As shown in FIGURE 2 two sets of supports 15 and plow-like vanes 19 are spaced along the trough 10, although any number of sets of such vanes may be spaced along the trough, in order to attain a thorough mixing of the sand conveyed therealong.

In operation of the conveyor, the trough 10 is reciprocably driven at a relatively long conveying stroke, which may be of the order of between eight and twelve inches, to flow the sand therealong in the direction of the arrow shown in FIGURES 1 and 2. As the sand approaches the plow-like mixing vanes 19, 19 it will tend to ride up the spiral faces 23 of said vanes and then drop to one side of said vanes. This in effect upheaves the sand, and brings the sand which was formerly in the bottom of the trough up toward the top of the trough, resulting in a uniform mixture of the sand and distribution of the water therethrough, to provide a uniformly moistened molding sand at the discharge of the trough of such consistency that it may be placed in a flask for molding as soon as it is discharged from the trough.

In the present form of the invention seven plow-like vanes 19 are equally spaced along the bottom of the trough 10. The number and width of the vanes may, however, vary in accordance with the consistency of the material conveyed along the trough. The leading end portions of the vanes are inclined at a receding angle with respect to a line extending across the trough perpendicular to the longitudinal axis of the trough and intersecting the advance tips of the vanes. The vane area along the trough opposing the flow of material along the trough will be the projected area of the vanes to a line extending across the advance tips of the vanes and may be as much as one-half of the total area of the trough at the bottom of the trough and should not be much less than one-third of the total area of the trough at the bottom of the trough, in order to effect efficient mixing of the sand without unduly retarding the efficiency of the conveying action.

It should here be understood that the vane area is partially dependent upon the consistency of the material being conveyed and that the vane area may be smaller with a lighter or dryer material in order to effect an efficient mixing of the material, it being understood that the trough need not necessarily be restricted to the mixing of wetted sand, but may also be efficiently employed to mix and convey dry sand or other granular materials.

While I have herein shown and described one form in which the invention may be embodied, it may readily be understood that various modifications and variations in the invention may be attained without departing from the spirit and scope of the novel concepts thereof.

I claim as my invention:

1. A shaker conveyor trough reciprocably movable to convey molding sand and the like having,
    a bottom and side walls extending upwardly therefrom,
    and having means for upheaving the sand from the bottom of said trough as conveyed therealong by the reciprocable action of said trough comprising:
        a series of laterally spaced plow-like vanes mounted on said trough for reciprocable movement therewith and extending angularly downwardly into said trough into facing relation with respect to the material flowing therealong and pitched to effect the lifting and dropping of the sand as conveyed along said trough.

2. A reciprocable shaker conveyor trough for molding sand and the like having,
    a bottom,
    upright side walls extending upwardly therefrom,
    a plurality of laterally spaced plow-like vanes mounted on said trough and extending angularly downwardly within said trough to positions adjacent the bottom thereof and inclined with respect to an axis extending transversely of the trough, to effect an uplifting and lateral motion of the sand between said strips as conveyed along said trough, by the reciprocable motion thereof.

3. A shaker conveyor trough in accordance with claim 2, wherein the plow-like vanes are arranged in side by side relation with respect to each other and extend into the trough from the top thereof and are inclined downwardly toward the receiving end and bottom of the trough as they extend downwardly therealong and are also inclined transversely with respect to the trough in a generally helical form, and have leading end portions along the bottom of the trough, inclined in a receding direction with respect to a line extending transversely of the trough, and taking up an area along the bottom of the trough which is less than one half of the trough area along its bottom, to impart a lifting and side shifting action on the sand as it moves along the bottom of said trough.

4. In a shaker conveyor particularly adapted to convey molding sand and the like,
    a trough section having a flat bottom and side walls extending upwardly therefrom and adapted to be driven with a relatively long stroke reciprocable conveying action, to effect the travel of sand therealong in one direction,
    a support extending across said trough adjacent the upper ends of said side walls and mounted thereon,
    and a plurality of mixing plow-like vanes suspended from said support and inclined downwardly therefrom toward the bottom of said trough and having helical faces pitched in a direction to upheave and laterally move the sand as it passes therealong.

5. A shaker conveyor in accordance with claim 4, wherein the mixing plow-like vanes extend from the support toward the bottom of the trough in a helical path and are secured at their lower ends to the bottom of said trough to extend angularly with respect to the flow of sand along the trough and upheave the sand laterally from the bottom of the trough as it is conveyed therealong.

6. A shaker conveyor in accordance with claim 5, wherein a plurality of supports and sets of laterally spaced plow-like vanes are spaced along the trough from the receiving to the discharge end thereof.

7. A shaker conveyor trough for conveying and mixing molding sand and the like having,
    a flat bottom having outwardly flared side walls extending from opposite sides thereof and terminating into parallel upright flanges,
    and means effecting an upheaving action on the sand as it passes along said trough for mixing the sand to a uniform moisture consistency comprising,
        at least one support extending across said upright flanges and secured thereto at its ends,
        a plurality of laterally spaced plow-like vanes extending downwardly from said support and having generally horizontal tabs extending beneath said support and secured thereto, and generally helical faces, facing the sand moving along the trough and extending angularly downwardly and rearwardly from said tabs in helical paths to the bottom of said trough,
        said plow-like vanes having horizontal bottom surfaces abutting the bottom of said trough and secured thereto, to retain said vanes in position on said trough with the plow-like sloping inner ends thereof extending angularly with respect to the direction of motion of said trough for uplifting and turning the sand laterally as it passes along said trough.

8. A reciprocably movable conveyor trough for conveying generally dry materials having a bottom forming a material carrying surface and having mixing means associated therewith and comprising:
   a series of plow-like vanes extending downwardly into the trough into engagement with the bottom thereof and pitched at a receding angle with respect to the travel of material along the trough to bring the underlying material to the top of the trough by the natural conveying motion of the trough.

9. A reciprocably movable conveyor trough in accordance with claim 8,
   wherein the area of the vanes along the bottom of the trough is less than one half of the trough area along its bottom in the region of the vanes.

References Cited by the Examiner

UNITED STATES PATENTS

| | | | |
|---|---|---|---|
| 1,004,411 | 9/1911 | Gilbreth | 259—150 |
| 2,533,852 | 12/1950 | Tietig | 259—180 |

FOREIGN PATENTS

| | | |
|---|---|---|
| 877,999 | 9/1942 | France. |
| 203,375 | 6/1939 | Switzerland. |

WALTER A. SCHEEL, *Primary Examiner.*

R. W. JENKINS, *Assistant Examiner.*